(12) United States Patent
Larsen et al.

(10) Patent No.: US 7,948,485 B1
(45) Date of Patent: May 24, 2011

(54) REAL-TIME COMPUTER SIMULATION OF WATER SURFACES

(75) Inventors: Eric Larsen, Foster City, CA (US); Hrishikesh R. Deshpande, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/302,518

(22) Filed: Dec. 12, 2005

(51) Int. Cl.
*G06T 17/00* (2006.01)

(52) U.S. Cl. .................. 345/420; 345/419; 345/473

(58) Field of Classification Search .............. None
See application file for complete search history.

(56) References Cited

U.S. PATENT DOCUMENTS

| | | | | |
|---|---|---|---|---|
| 5,777,619 | A * | 7/1998 | Brinsmead | 345/419 |
| 5,848,260 | A * | 12/1998 | Chen et al. | 703/5 |
| 5,877,777 | A | 3/1999 | Colwell | 345/473 |
| 5,937,094 | A * | 8/1999 | Nagasawa | 382/232 |
| 6,014,151 | A * | 1/2000 | Cohen et al. | 345/474 |
| 6,437,784 | B1 * | 8/2002 | Bentley et al. | 345/473 |
| 6,500,008 | B1 * | 12/2002 | Ebersole et al. | 434/226 |
| 7,267,752 | B2 * | 9/2007 | King et al. | 204/547 |

OTHER PUBLICATIONS

Akenine-Moller, T., Haines, E., Billboarding, Dec. 2002, http://www.flipcode.com/articles/article_rtr2billboards.shtml, flipcode Daily Game Development News & Resources, pp. 1-8.*

Yu, Y., Jung, H., Cho, H., A new water droplet model using metaball in the gravitational field, Computers & Graphics, Mar. 1999, pp. 213-222.*

Paul Bourke, "Polygonizing a scalar field", May 1997, downloaded from the internet: <http://astronomy.swin.edu.au/~pbourke/modelling/polygonise/>.

M. Müller et al., "Particle-Based Fluid Simulation for Interactive Applications", Eurographics/SIGGRAPH Symposium on Computer Animation (2003), D. Breen, M. Lin (Editors).

J. F. O'Brien, J. K. Hodgins, "Dynamic Simulation of Splashing Fluids", from *Proceedings of Computer Animation '95*, pp. 198-205. Held Apr. 19-21, 1995, Geneva, Switzerland.

J. Bloomenthal, "An Implicit Surface Polygonizer", Graphics Gems IV, ed. P. Heckbert, Academic Press Professional, Inc. San Diego, CA, USA, 1994, pp. 324-349.

U.S. Appl. No. 11/302,314, "Real Time Computer Simulation of Cloth", Inventor: Vangelis Kokkevis, filed Dec. 12, 2005.

U.S. Appl. No. 11/302,517, "Real-Time Computer Simulation of Caustics", Inventors: Antoine Labour and Steven T. Osman, filed Dec. 12, 2005.

Final Office Action dated Dec. 11, 2008 for U.S. Appl. No. 11/302,517, 13 pages.

Office Action dated Mar. 2, 2009 for U.S. Appl. No. 11/302,517, 15 pages.

Fournier et al., "Simulating the Flow of Liquid Droplets", Proceedings of Graphics Interface '98, 1998, 133-42.

* cited by examiner

*Primary Examiner* — Said Broome

(74) *Attorney, Agent, or Firm* — Joshua D. Isenberg; JDI Patent

(57) ABSTRACT

Real-time simulation of liquids is disclosed. A liquid may be modeled as a collection of particles. Particles separated from one or more nearest neighbor particles by a distance greater than a threshold distance may be separated out as droplets. An iso-surface may then be determined and rendered for the particles not separated out as droplets. The droplets may be rendered as sprites.

21 Claims, 2 Drawing Sheets

REAL-TIME COMPUTER SIMULATION OF WATER SURFACES

FIELD OF THE INVENTION

Embodiments of the present invention are related to computer animation and more particularly to simulation of the behavior of liquids and similar materials in computer animation.

BACKGROUND OF THE INVENTION

Computer animation is the art of creating moving images via the use of computers. To create the illusion of movement, an image is displayed on the computer screen then quickly replaced by a new image that is similar to the previous image, but shifted slightly. This technique is identical to how the illusion of movement is achieved with television and motion pictures. Increasingly computer animation is created by means of 3D computer graphics programs. Such programs often use physics simulator routines to more realistically depict events being animated. A physics simulator models objects depicted in an animation based on physical laws. For example, a physics simulator may model the forces acting on an object and, based on those forces, determine the object's acceleration at a frame of the animation. From the acceleration, the simulator can determine the object's velocity in the next frame. From the objects current velocity and position, the simulator may determine the object's position in a subsequent frame. The forces can be based partly on input from a user interacting with the object via an input such as a joystick, steering controller, or other interface. As such, physics simulators are particularly useful for simulating interaction with characters in a video game.

Computer animation has been used to simulate liquids such as water in video games and computer animation for motion pictures. Realistic depiction of liquids presents numerous challenges in physically modeling the behavior of the liquid in terms of its motion and its optical effects. One particular challenge in computer simulation of the behavior of liquids is the simulation of a liquid splashing. When a real liquid splashes some of the liquid may separate into droplets. Unfortunately, techniques for realistically and efficiently computer simulating such splashing behavior of liquids and similar materials have been unsatisfactory.

Particles systems and even smoothed particles (also called meta-balls), with some interaction forces, for fast fluid simulation. Smoothed particle hydrodynamics (SPH) was a more rigorous version of this. Application of this technique to graphics is described, e.g., in "Smoothed Particles: A new paradigm for animating highly deformable bodies" by Desbrun and Gascuel. There was also a real-time implementation of SPH and marching cubes on the web by a programmer named Takashi Amada.

There are non-particle methods, i.e., grid methods, used for splashing animations but they are typically expensive and used for off-line simulations. Methods presented by Jos Stam were real-time but it is believed they were limited to gaseous fluids, and the demos at least were only 2-D.

Thus, there is a need in the art, for a method for simulating the behavior of liquids and an apparatus for implementing such a method.

SUMMARY OF THE INVENTION

To overcome the above disadvantages, embodiments of the invention are directed to real-time simulation of liquids. A liquid (or a portion of a liquid) may be modeled as a collection of particles. Particles that are separated from one or more nearest neighbor particles by a distance greater than a threshold distance may be separated out as droplets. An iso-surface may be determined and rendered for the particles not separated out as droplets and the droplets may be rendered as sprites.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

Figure 1:
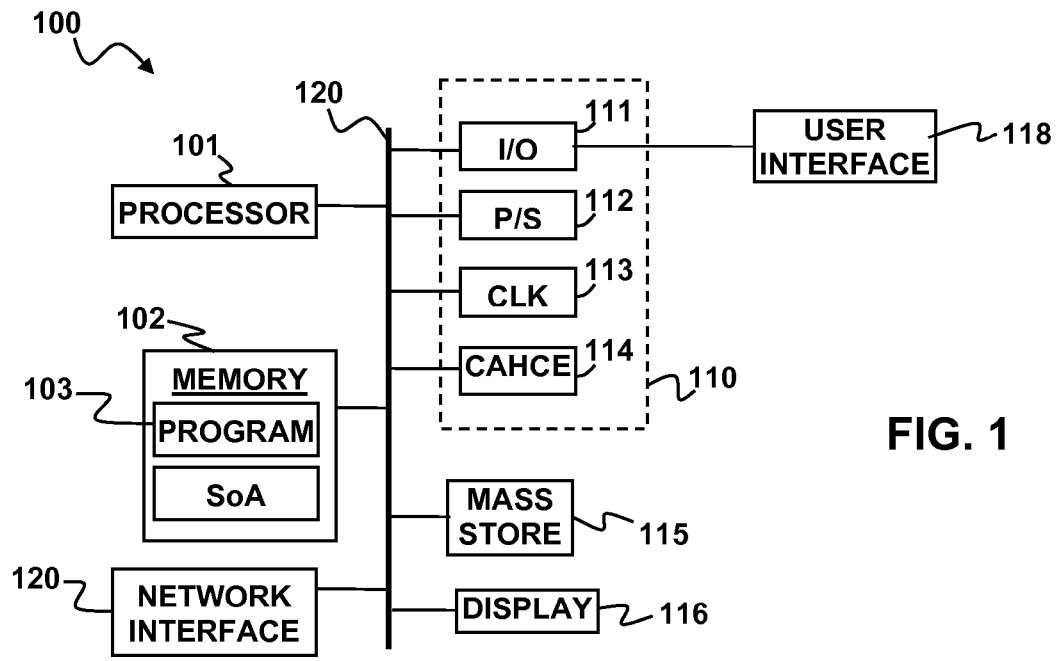
FIG. 1 is a schematic diagram of a computer animation apparatus according to an embodiment of the present invention.

Embodiments of the present invention are related to real-time computer simulation of liquids. FIG. 1 illustrates a block diagram of a computer apparatus 100 for such real time computer simulation. The apparatus 100 may generally include a processor module 101 and a memory 102. The processor module 101 may include multiple processors. For example, the processor module 101 may include a cell processor to perform physics calculations of the real-time simulation and a graphics card to render images based on the positions of objects calculated by the cell processor. A cell processor is a type of parallel processor in which a power processor unit (PU) and one or more synergistic processor units (SPU) can share access to a main memory. In addition to the main memory, each SPU may have its own associated local store. Cell processors are described, e.g., in U.S. patent application Ser. No. 11/238,077, which is incorporated herein by reference. An example of a graphics card would be an NVIDIA Quadro FX 3450 available from Corporation of Santa Clara Calif. (www.nvidia.com).

The memory 102 may be in the form of an integrated circuit, e.g., RAM, DRAM, ROM, and the like). The memory may also be a cell processor main memory or SPU local store. The apparatus 100 may also include well-known support functions 110, such as input/output (I/O) elements 111, power supplies (P/S) 112, a clock (CLK) 113 and cache 114. The device 100 may optionally include a mass storage device 115 such as a disk drive, CD-ROM drive, tape drive, or the like to store programs and/or data. The device 100 may also optionally include a display unit 116 and user interface unit 118 to facilitate interaction between the device 100 and a user. The display unit 116 may be in the form of a cathode ray tube (CRT) or flat panel screen that displays text, numerals, graphical symbols or images. The user interface 118 may include a keyboard, mouse, joystick, light pen or other device that may be used in conjunction with a graphical user interface (GUI). The apparatus 100 may also include a network interface 120 to enable the device to communicate with other devices over a network, such as the internet. These components may be implemented in hardware, software or firmware or some combination of two or more of these.

A computer program 103 may be stored in the memory 102 in the form of processor readable instructions that can be executed on the processor module 101. The program 103 may include instructions to implement a method for real-time simulation of liquids. The instructions of the program 103 may proceed according to the steps shown the flow diagram of the method 200 in FIG. 2.

Figure 2:
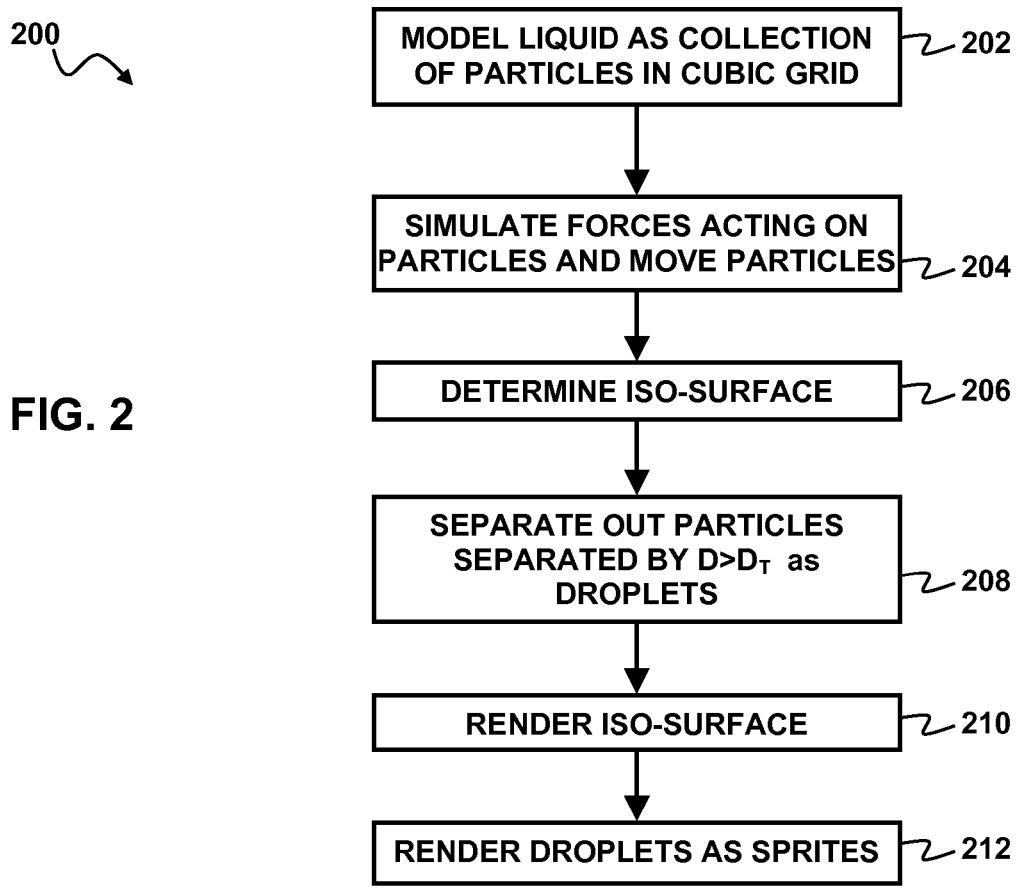
FIG. 2 is a flow diagram illustrating a method for simulation of liquid behavior according to an embodiment of the present invention.
Figures 3A, 3B:
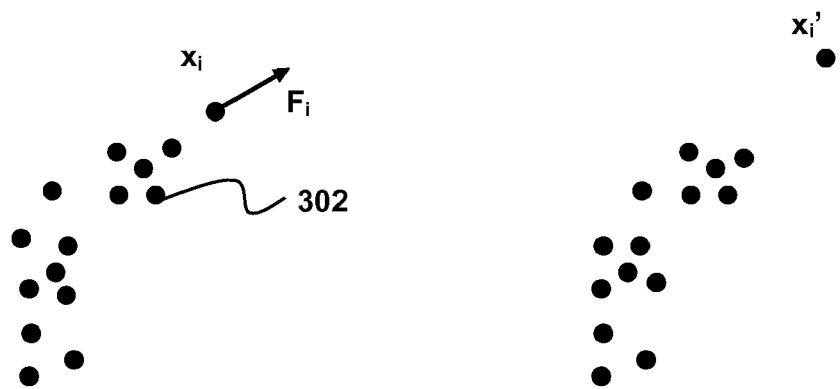
FIGS. 3A-3D are a sequence of schematic diagrams illustrating computer simulation of liquid behavior according to an embodiment of the present invention.

The method 200 may be understood by referring simultaneously to FIG. 2 and to FIGS. 3A-3D. At step 202 a liquid is modeled as a collection of particles 302 as depicted in FIG. 3A. In embodiments of the present invention, some uncontained or freely flowing liquids, e.g., water that is spilled, may be simulated as particles. By way of example, techniques such as smoothed particle hydrodynamics (SPH) may be used to simulate the behavior or such liquids.

Forces acting on the particles, such as gravity, wind, collisions with rigid objects, forces between the particles 302 and the like, may be simulated at step 204 in any suitable fashion. Forces between particles may be simulated based on a localized particle density and distance of particles with respect to each other. The forces between particles may decrease as inter-particle distance increases and increase with particle density. By way of example, "pressure forces" may be such that they repel particles when the particle density is above a chosen value, but also attract when the density is below. This force may be scaled by a function of their distance, which falls to 0 when the particles' volumes don't overlap. In SPH there are other forces such as viscosity (damping) based on relative motion of the particles, and surface tension. Alternatively, other forms of damping may be used and surface tension may be omitted Based on the simulated forces, the motion of each particle 302 may be calculated from one frame to another. New positions $x_i'$ for the particles 302 may be determined as shown in FIG. 3B. Each particle 302 may be characterized by its position x and its velocity v. It is noted that x and v are vector quantities having both magnitude and direction. Each of these quantities may be represented by three values that correspond to its three-dimensional components. In a time-stepping loop, the new position x' and velocity v' may be computed by applying the rules:

$$x'=x+v\Delta t$$

$$v'=v+a\Delta t$$

where $\Delta t$ is the time step between frames, and a is the acceleration computed using Newton's second law: f=ma (where f is the accumulated force acting on the particle). This technique is often referred to as simple Euler integration. It is noted that the quantities a, f, x, and v are vector quantities characterized by a magnitude and a direction.

In some embodiments of the invention, the net force f on a particle 302 may be converted to a displacement so that Verlet integration can be used for stability. In a Verlet integration, instead of storing each point mass's position and velocity, the current position x and previous position x для each particle are stored. For a fixed time step $\Delta t$, the update rule (or integration step) may be expressed as:

$$x'=2x-x'+a\Delta t$$

$$x'=x$$

A gravity compression instability commonly occurs in simulations that have some kind of "penalty force" like the pressure forces in SPH. Very compressed particles cause a large pressure force that can lead to an explosion of the particles. Basically the integrator is very inaccurate at these high-strain situations. Then there can also be a chain reaction where one excessive motion causes another more excessive motion and the simulation "diverges". The particle velocities may be propagated from bottom to top to avoid the gravity compression/instability.

By way of example, a particle simulation may use a single SPU of a cell processor to simulate the motion of 1400 particles. The particle state may always remain resident on the SPU. The particle state may include current position x, previous position x', velocity v and local density ρ for each particle.

The particles may be sorted vertically each frame for coherence. The particles are sorted by their height along the "up" direction. As used herein, coherence means that the particles can be resorted easily because they are typically still "mostly" sorted in after one step. An Insertion sort can make little local fixes to the sorted order. Alternatively, some full re-sort methods are so fast that they would be adequate for this purpose. By way of example, the particles may be sorted using an insertion sort. The insertion sort over all particle pairs may be implemented a nested loop over all particle pairs. For n particles the inner loop pairs the $i^{th}$ particle with each of the remaining n−1 particles while the outer loop increments the particle index i from 1 through n. The sorted order may be used to determine an early-exit from the inner loop.

In some embodiments, the software may be pipelined and unrolled by hand. Loop unrolling refers to taking the operations performed at each iteration of that loop, and repeating that operation several times in a single iteration. Compilers can do this, but if the compiler does not do this well, it may be desirable not to rely on the compiler. "Software pipelining" is another way of transforming a loop to reduce stalls. In software pipelining a loop is rearranged so that data stores and loads can happen concurrently with execution. A software pipeline generally refers to a chain of processes or data processing entities arranged so that the output of each element of the chain is the input of the next element in the chain. A dependent instruction, i.e., one that uses a result of a prior instruction, needs to occur at a sufficient delay so that the results of that earlier instruction are ready. If the dependent instruction is executed too quickly, the processor has to stall for the prior result. Some amount of buffer may be provided between consecutive elements. By way of example the inner loop may be unrolled 4 times, with 16 pairs of particles processed in total to fill dependency stalls.

The inner loop may use "structure-of-array" (SoA) processing in which vectors are transposed from an "array-of-structures" inside the loop. Such transposes may dual-issue with processing. Two sub-steps may be taken for stability. Computations of the motions of these particles may be performed by organizing the data representing the three-dimensional coordinates (x, y z) for the particles in a structure of arrays (SoA). The term "structure of arrays" refers to a data structure used to represent the coordinates for multiple objects. A structure of arrays allows operation on multiple points to take place simultaneously by operating on the coordinates of multiple points. This is possible if the x-, the y- and z-coordinates of the points are collected together. The application can then process multiple x-, y- and z-coordinates for the particles separately. For this, the program 103 may rearrange the data into either three separate arrays, or a structure of arrays with one array each for one coordinate. By contrast, 3D applications usually store the coordinates of single point in one structure. When handling multiple points, such applications use an array of structures (AoS), where each structure in the array represents the x-, y-, and z-coordinates for a single point. Such use of SoA representation of the particle data can help performance of fluid simulation.

Figure 3C:

Once the new positions of the particles have been calculated, at step 206 an iso-surface 304 may be constructed over the particles 302 to simulate the surface of a liquid as shown in FIG. 3C. Iso-surface computation may be performed using a three-dimensional mathematics application programming interface (API) with PU/SPU/scalar implementations. The iso-surface construction program may be debugged on a PC or PU and recompiled to run on an SPU. Generation of the particle iso-surface 304 may proceed, e.g., as described by J. Bloomenthal in "An Implicit Surface Polygonizer". *Graphics Gems IV*, ed. P. Heckbert, Academic Press Professional, Inc. San Diego, Calif., USA, 1994, pp 324-349, which is incorporated herein by reference.

A first hash table may be used to bucket the particles into 3-D grid cells 306. The bucketing of the particles in the grid cells 306 allows a fixed memory footprint to be associated with the collection of particles 302. By way of example, and without loss of generality, the grid cells 306 may be cubes. Embodiments of the present invention are not limited to cubic cells. For example, in some embodiments, the cells may be tetrahedrons or other polyhedrons. A 3-D key representing a particular grid cell 306 may be packed into a single word. A second hash-table may be used to store the neighboring grid cells for each given grid cell. The nearest neighbor cells may be determined by dividing each cubic grid cell 306 into eight sub-cubes. For a particle located in a particular sub-cube, the neighboring cells will be the cubes adjacent to that sub-cube. The positions of the particles are compared against the eight sub-cubes to find corner values and compute the resulting triangles. Thus the iso-surface computation for that particle will be based on the cube-containing that particle and the seven cubes neighboring the corner of the cube where the particle can be found. This is sufficient for the iso-value used.

It is noted that for embodiments of the invention that include processing on a cell processor, the implementation described above can allow the hash-table to fit in the local store of a SPU. Grid cells 306 are traversed in both tables. The vertices are of the triangles that make of the iso-surface 304 may be stored in a buffer and then transferred out when the buffer is filled. It is important to pick the right iso-threshold so that the iso-surface 304 doesn't cut out grid cells 306 that have not been included. As used herein, the term iso-threshold refers to how close to a blob of particles the iso-surface 304 is drawn.

By way of example, a marching cubes technique may be used to determine an iso-surface of the particles. As used herein, marching cubes refers to a polygonization method whereby a polygonal (i.e., parametric) approximation to an implicit surface enveloping the particles 302 is created from the implicit surface function. Such a technique allows the iso-surface 304 to be rendered using conventional polygon renderers. It also permits non-imaging operations, such as positioning an object on the surface. Polygonization consists of two principal steps. First, space is partitioned into adjacent cells 306 at whose corners the implicit surface function is evaluated. Negative values are considered inside the surface, positive values outside. Second, within each cell, the intersections of cell edges with the iso-surface 304 are connected to form one or more polygons 305.

If isolated particles are too far apart from other particles they can be separated out from the iso-surface 304 as droplets 308 at step 208. For example, if a particle is separated from its nearest neighbor by a distance d that is greater than a threshold distance $d_t$ that particle may be separated from the iso-surface 304. The distances d are computed between a particle and nearby neighbors. Other particles are known to be farther away. The threshold distance $d_t$ may be related to smoothed particle "sizes" for the particles 302 in such a way as to avoid drawing separate droplets for particles that are sticking together. By adjusting this threshold distance, an animator may vary the number of droplets created and thereby alter the appearance of the liquid, e.g., when it splashes.

Figure 3D:
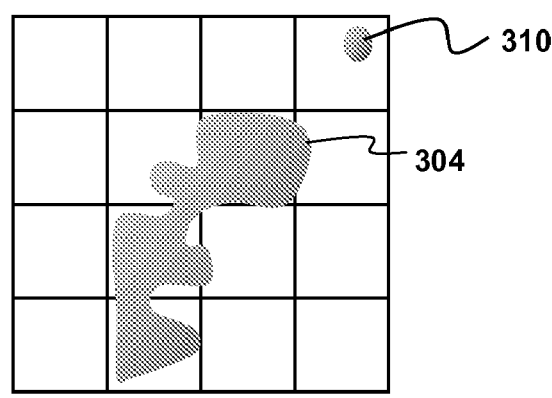

The iso-surface 304 containing the remaining particles that are not isolated as droplets 308 may be rendered in a conventional fashion at step 210 as shown in FIG. 3D. Rendering typically involves mapping a color value and intensity for each pixel to each polygon 305 of the iso-surface 304. Such rendering may take into account effects of reflection of light from the iso-surface 304 and refraction of light through the simulated liquid. A static environment map may be used to simulate reflection from the water simulated by the iso-surface 304. A frame buffer may be used to simulate the refraction.

The droplets 308, by contrast, may be rendered as sprites 310 at step 212. As used herein the term "sprite" generally refers to a partially transparent two dimensional animation that is mapped onto a special plane in a three dimensional scene. Unlike a texture map, the sprite plane is always perpendicular to the axis emanating from the camera. The sprite image may be scaled to simulate perspective, it can be rotated two dimensionally, it can overlap other objects and be occluded, but it can only ever be viewed from the same angle. This rendering method is also referred to as billboarding.

Sprites can provide an effective and efficient way to depict the droplets, particularly if the image of the droplet is relatively small and on screen for a relatively short period of time. This technique is particularly effective where the image inside the sprite used to depict the droplet already depicts a three dimensional object (such as a sphere). The use of sprites in this manner reduces the cost (in terms of allocation of processor resources) to drawing the isosurface and also makes the droplets appear smoother. To simulate liquid droplets the sprites 310 may resemble reflective/refractive spheres. To further enhance the realism of the droplets, randomness may be encoded in the vertex value for the particle(s) making up the droplets to distort the corners of sprite. Such distortion makes the sprite look less regular and blend better with iso-surface 304.

It is noted that not all liquids shown in a simulation need to be modeled as particles. For example, height-field techniques may be used to model liquid bodies held in containers. In a height-field technique, a liquid may be physically modeled by dividing it up into a plurality of columns using a height-field technique. By way of example a body of water in a container may be represented by a two-dimensional array of water columns (e.g., in a 128×76 grid of columns). External pressures and gravity determine flow of water between the columns. Interaction between water columns and adjacent rigid bodies (e.g., bodies in the water or containers holding the water) may be modeled with a spring-damper between the rigid-bodies and water. These interactions may be modeled using multiple streaming data passes over the entire height field with each pass loading height-field data in sections.

In a first pass, interaction of rigid bodies with the liquid may be modeled, e.g., using a spring/damper penalty method for rigid-body forces. The input for each pass includes the state for each rigid body and the external pressure, flows and column heights for each section. The output from each pass includes the external pressures and forces on rigid bodies. In a second pass flow computations are performed. For a given column the flow computation may be limited to computation of the flow between the column and neighboring columns based on the column heights and external pressures. For example, in the case of an array of rectangular columns, the flow may be computed the given column and its eight nearest neighbor columns, i.e., the columns adjoining its side faces and side edges. In a third pass the heights are changed based on the flows calculated in the second pass. In a fourth pass, mesh vertices are created based on the column heights determined in the third pass. By way of example, the height field may be converted to mesh using a "star" pattern. For a processor module 101 including a graphics processor unit (GPU) that supports vertex texture, this pass could be performed on the GPU.

Once the fluid heights have been calculated and the surface of the liquid represented by the height-field simulation and the iso-surfaces for liquid represented by particle-based simulation the liquid may be rendered. Such rendering may take into account the effects of reflection from the liquid surface and refraction of light through the liquid. Reflection from liquid surfaces may requires an additional render of all objects surrounding the liquid so that images of these objects, or portions of these objects may be included in the reflection, e.g., as textures.

To simulate splashing effects, particles may "peel off" from the height field based on the velocity of the surface of the height field. For example, if the upward velocity of a region the surface of the height field exceeds some threshold, simulated particles are generated and distributed over the region. Initial upward velocities of the particles may be determined from the upward velocity of the height field. The particles may also include an initial horizontal velocity component based on the flows in the corresponding liquid columns and/or the motion of objects striking the surface. Details of this technique is described, e.g., by J. O'Brien and J. Hodgins, in "Dynamic Simulation of Splashing Fluids", *Proceedings of Computer Animation* '95, pp 198-205, Geneva Switzerland, 1995, which is incorporated herein by reference.

For splashes initiated by objects striking the body of liquid the peel off of particles may be limited to an impact zone in the vicinity of the location where the object strikes the surface of the liquid. If such an impact detected, splash particles may be added in zone for a few frames. To simplify the simulation of the splash particles, it may be assumed that their motion is only ballistic and that there are no interaction forces.

Additional details of height-field techniques and particle based fluid simulation techniques are described, e.g., by J. O'Brien and J. Hodgins, in "Dynamic Simulation of Splashing Fluids", *Proceedings of Computer Animation* '95, which is incorporated herein by reference and by M. Muller et al, in "Particle-Based Fluid Simulation for Interactive Applications" *Eurographics/SIGGRAPH Symposium on Computer Animation* (2003) D. Breen, M. Lin (Editors), which is incorporated herein by reference.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A system for real-time simulation of liquids comprising the steps of:
    means for modeling a liquid as a collection of point mass particles, wherein modeling a liquid as a collection of point mass particles includes calculating for each particle in the collection a motion of the particle due to internal inter-particle forces between the particle and each other particle in the collection, wherein each component of the motion is computed separately by simultaneously determining the contribution to that component due to inter-particle forces from multiple particles;
    means for separating out as droplets particles that are separated from one or more nearest neighbor particles by a distance greater than a threshold distance;
    means for determining an iso-surface for particles not separated out as droplets; and
    means for rendering the iso-surface and the droplets.

2. The system of claim 1 wherein determining the iso-surface includes determining a location of each particle with respect to one or more cells within a grid, and defining the iso-surface to intersect selected cells within the grid.

3. The system of claim 2 wherein the selected cells either contain one or more of the particles or are neighboring cells to a cell that contains one or more particles.

4. The system of claim 2 wherein the selected cells are selected by determining whether a cell contains one or more particles and which corner of a cell contains a particle, and selecting cells that neighbor the corner.

5. The system of claim 1 further comprising the step of modeling the behavior of a surface of a liquid body using a height-field simulation.

6. The system of claim 5 wherein modeling the behavior of the surface of the liquid body includes dividing the liquid body into a plurality of columns, modeling an interaction of zero or more rigid bodies to generate with the liquid body, wherein an input for modeling the interaction includes a state for each rigid body and an external pressure, flow and column height for each column, wherein an output for modeling the interaction includes external pressures and forces on the rigid bodies.

7. The system of claim 6 wherein modeling the behavior of the surface of the liquid body further includes computing one or more flows between two or more neighboring columns in the plurality of columns.

8. The system of claim 7 wherein for a given column the flow computation includes computation of a flow between the given column and neighboring columns based on the column heights and external pressures.

9. The system of claim 8 wherein the flow computation includes computation of flows between the given column and eight nearest neighbor columns.

10. The system of claim 7 wherein modeling the behavior of the surface of the liquid includes changing the heights of one or more columns in the plurality of columns based on the one or more flows.

11. The system of claim 10 wherein dividing the first surface into the plurality of first surface polygons includes generating vertices based on the heights of one or more columns in the plurality of columns.

12. The system of claim 1 wherein modeling the liquid includes simulating one or more forces acting on particles.

13. The system of claim 12, further comprising computing new positions for the particles based on the one or more forces.

14. The system of claim 1 wherein the threshold distance is related to a smoothed particle size for the particles.

15. The system of claim 14 wherein the threshold distance is selected in such a way as to avoid drawing separate droplets for particles that are sticking together.

16. An apparatus for real-time simulation of liquids, comprising:
a processor;
a memory coupled to the processor, the memory containing a set of processor readable instructions including:
an instruction for modeling a liquid as a collection of point mass particles, wherein modeling a liquid as a collection of point mass particles includes calculating for each particle in the collection a motion of the particle due to internal inter-particle forces between the particle and each other particle in the collection, wherein each component of the motion is computed separately by simultaneously determining the contribution to that component due to inter-particle forces from multiple particles;
an instruction for separating out particles separated from one or more nearest neighbor particles by a distance greater than a threshold distance as droplets;
an instruction for determining an iso-surface for particles not separated out as droplets; and
an instruction for rendering the iso-surface and the droplets.

17. A non-transitory computer readable storage medium encoded with a program for implementing a method for real time simulation of liquids, the method comprising:
modeling a liquid as a collection of point mass particles, wherein modeling a liquid as a collection of point mass particles includes calculating for each particle in the collection a motion of the particle due to inter-particle forces between the particle and each other particle in the collection, wherein each component of the motion is computed separately by simultaneously determining the contribution to that component due to internal inter-particle forces from multiple particles;
separating out particles separated from one or more nearest neighbor particles by a distance greater than a threshold distance as droplets;
determining an iso-surface for particles not separated out as droplets; and
rendering the iso-surface and the droplets.

18. The system of claim 1 wherein the means for rendering the iso-surface and the droplets includes means for rendering the droplets as sprites.

19. The system of claim 18 wherein the sprites resemble reflective/refractive spheres.

20. The system of claim 19, further comprising means for distorting the reflective/refractive spheres.

21. The system of claim 18, further comprising randomizing vertex values of the particles that make up the droplets to distort the corners of the sprite.

* * * * *